United States Patent Office 3,240,653
Patented Mar. 15, 1966

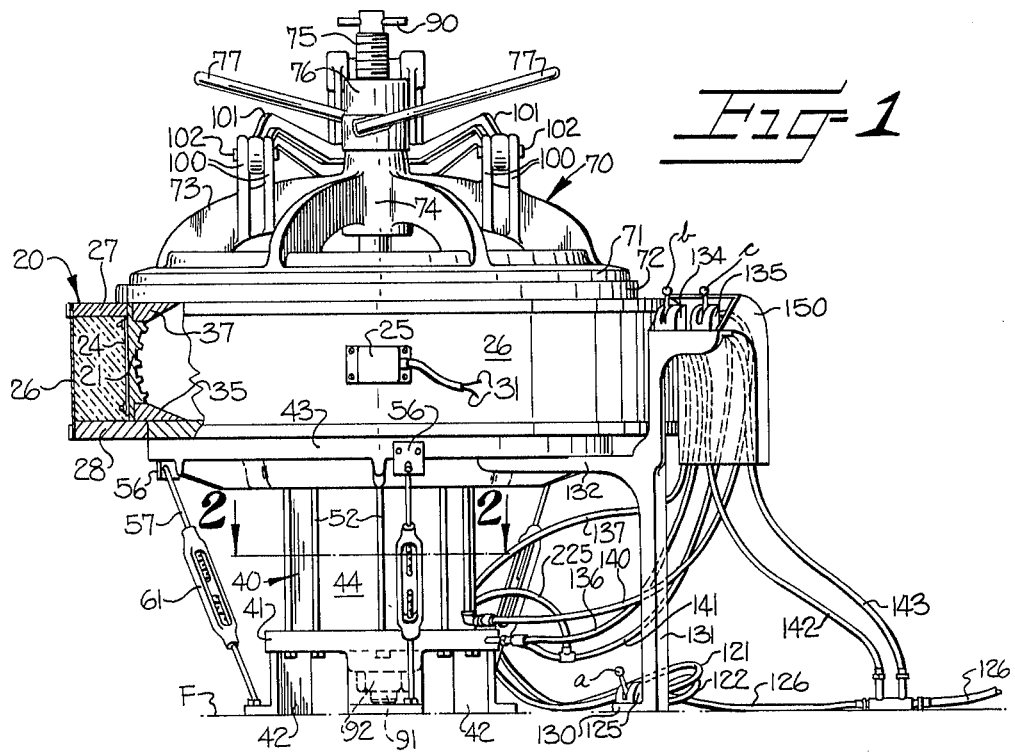
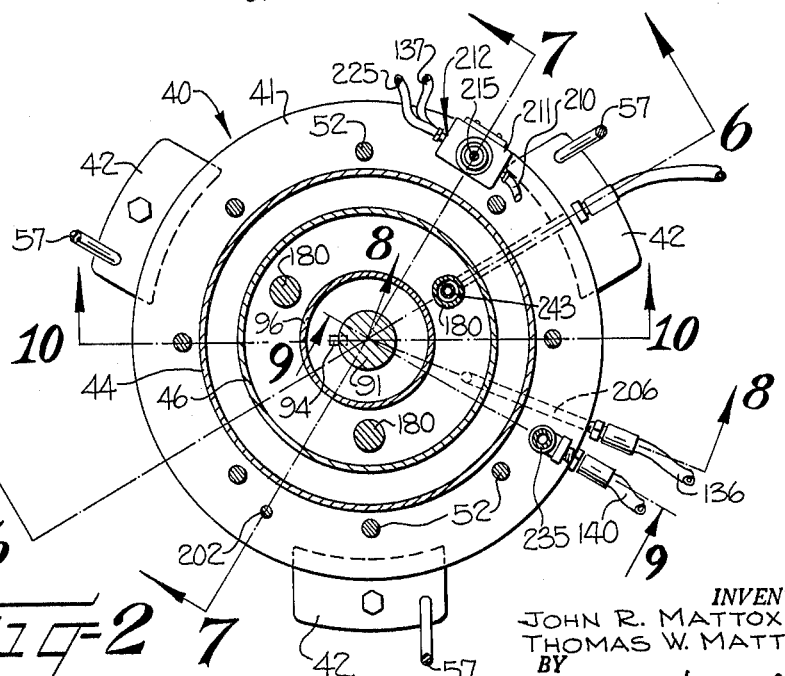

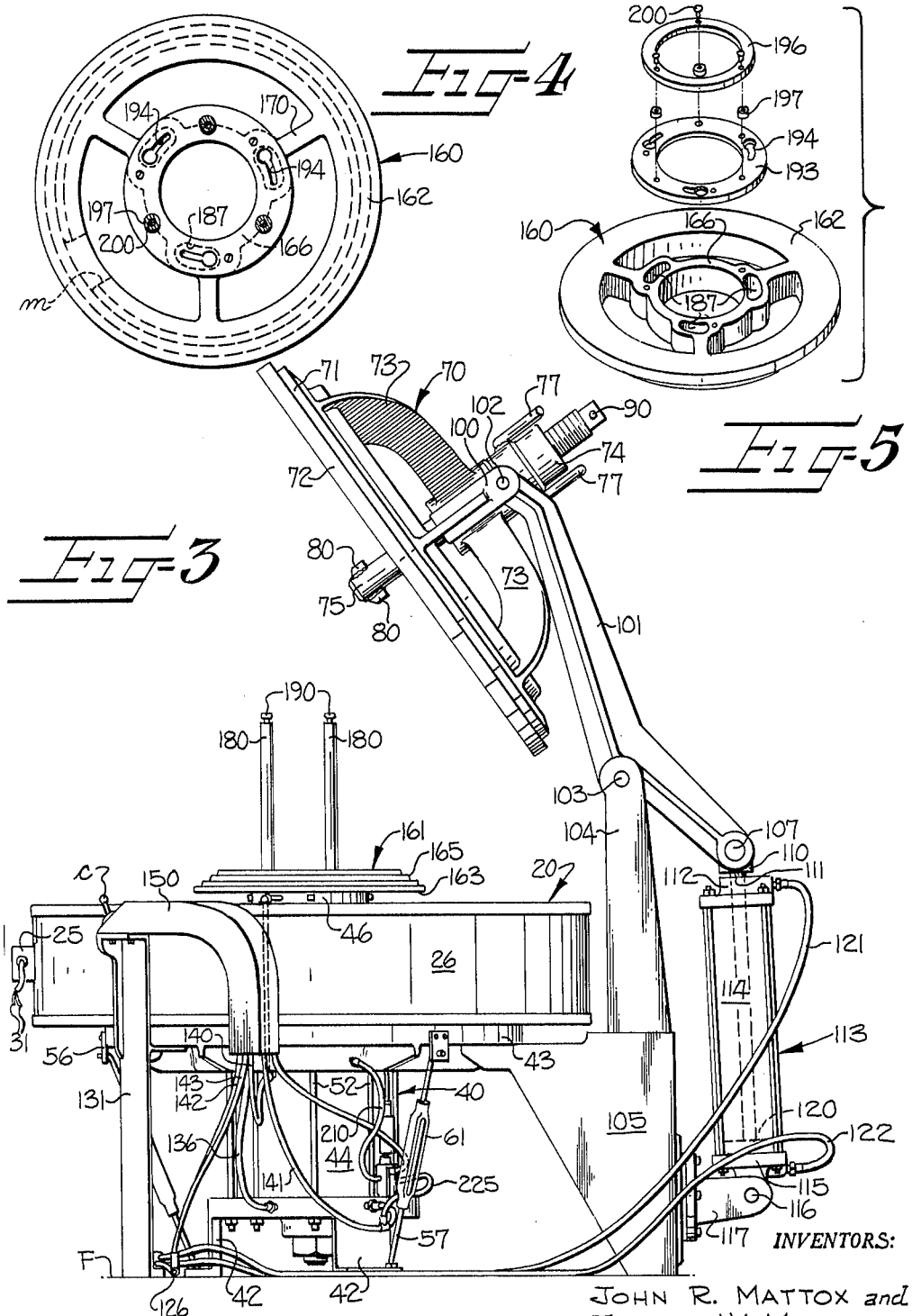

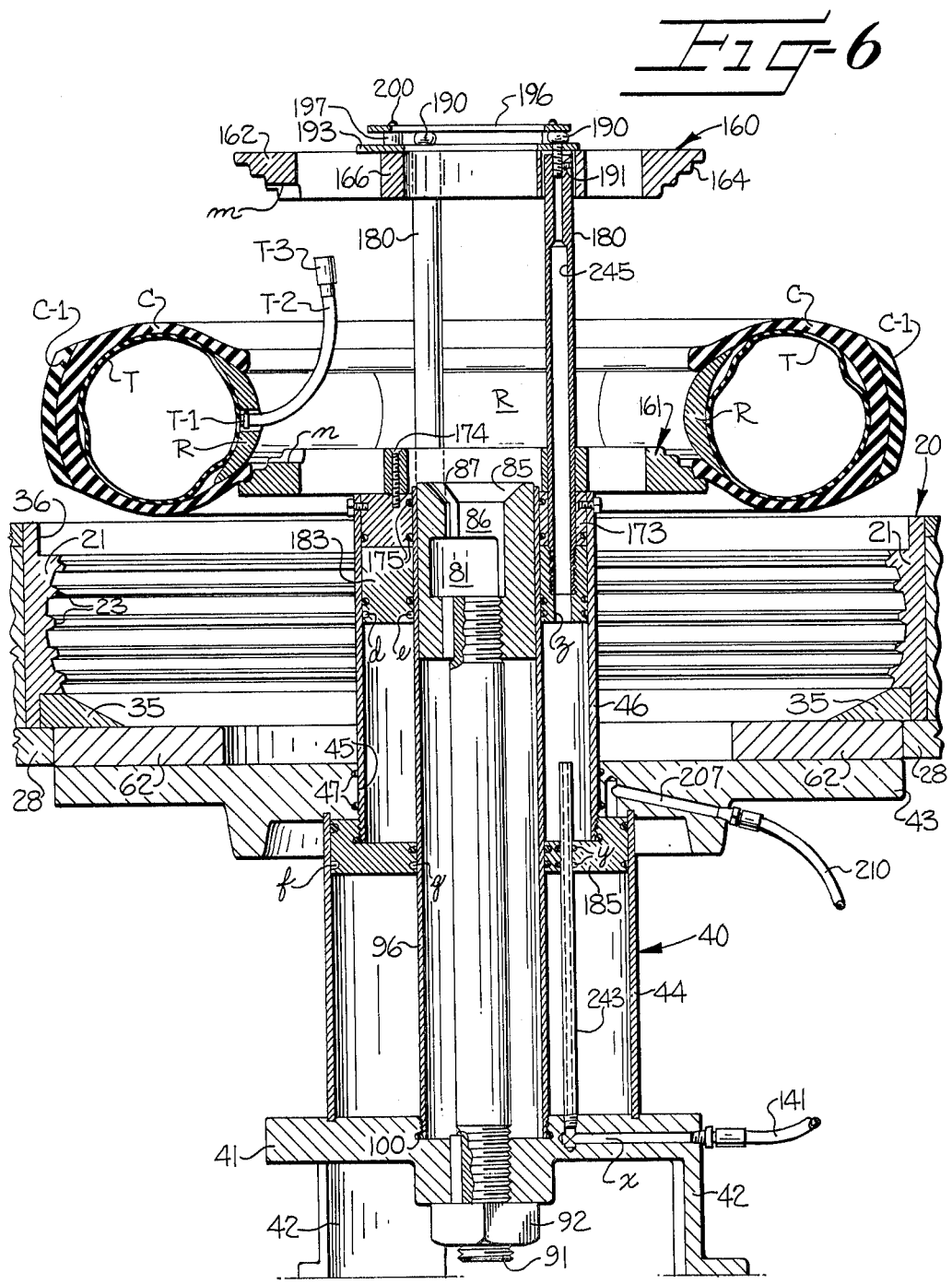

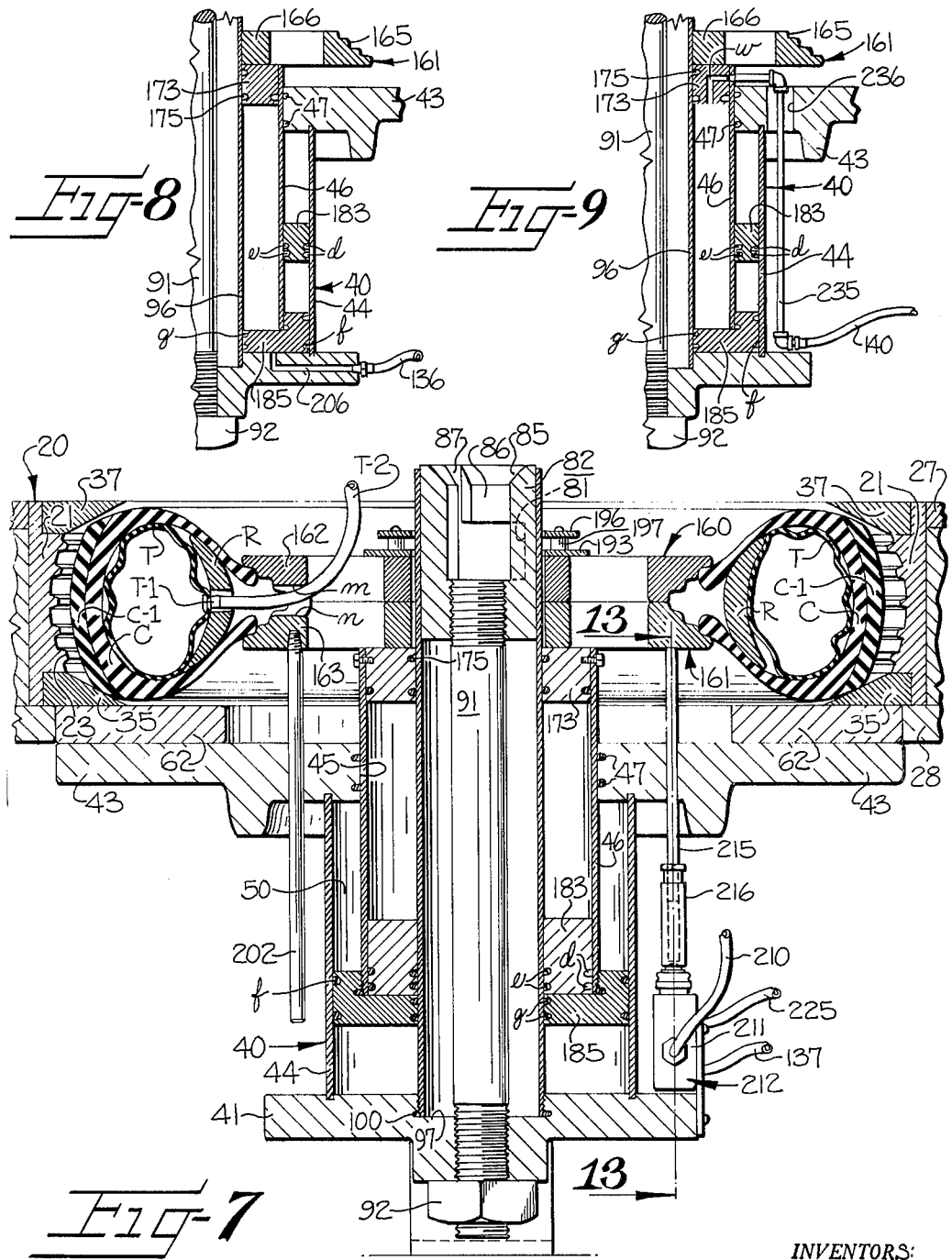

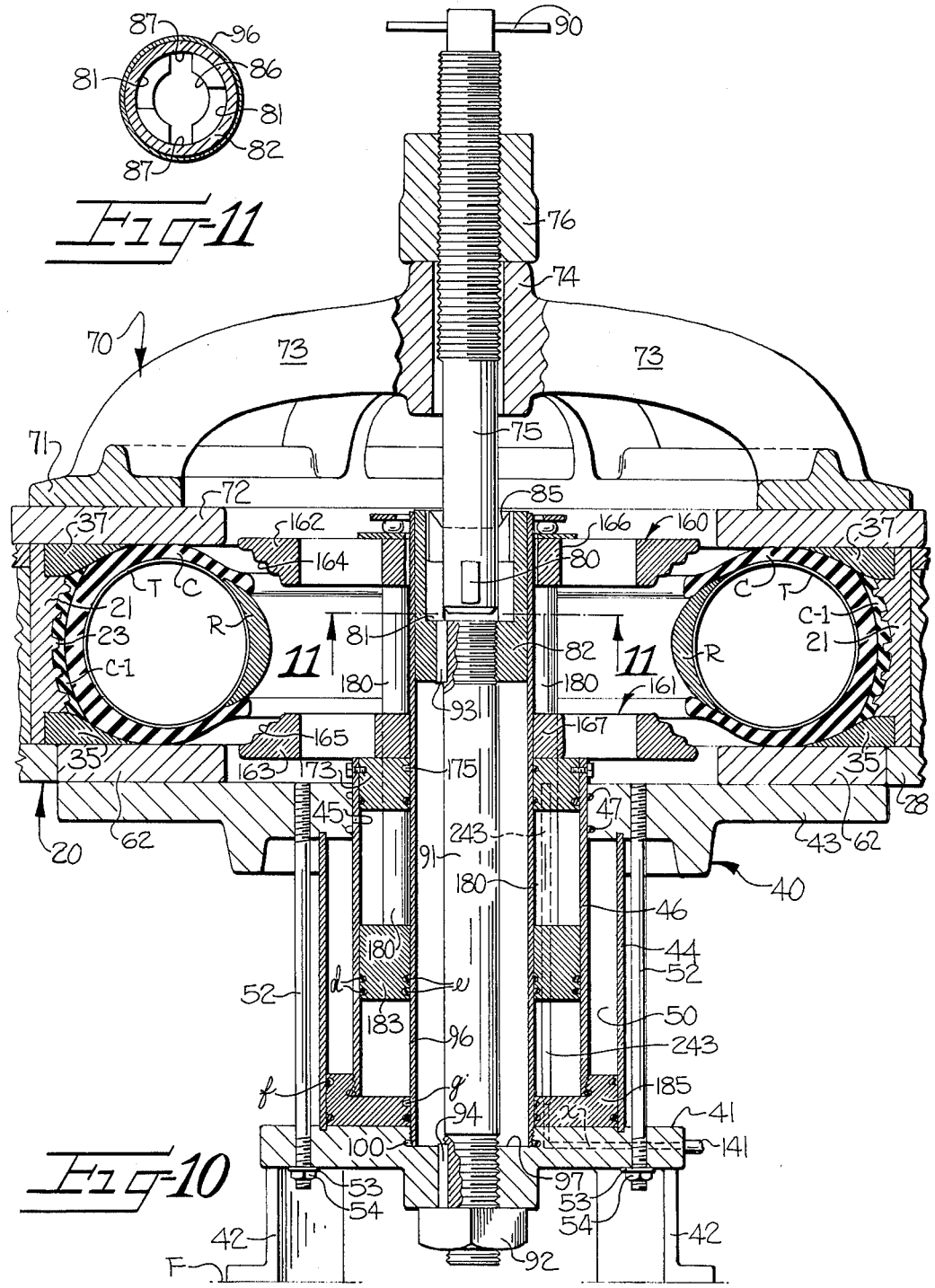

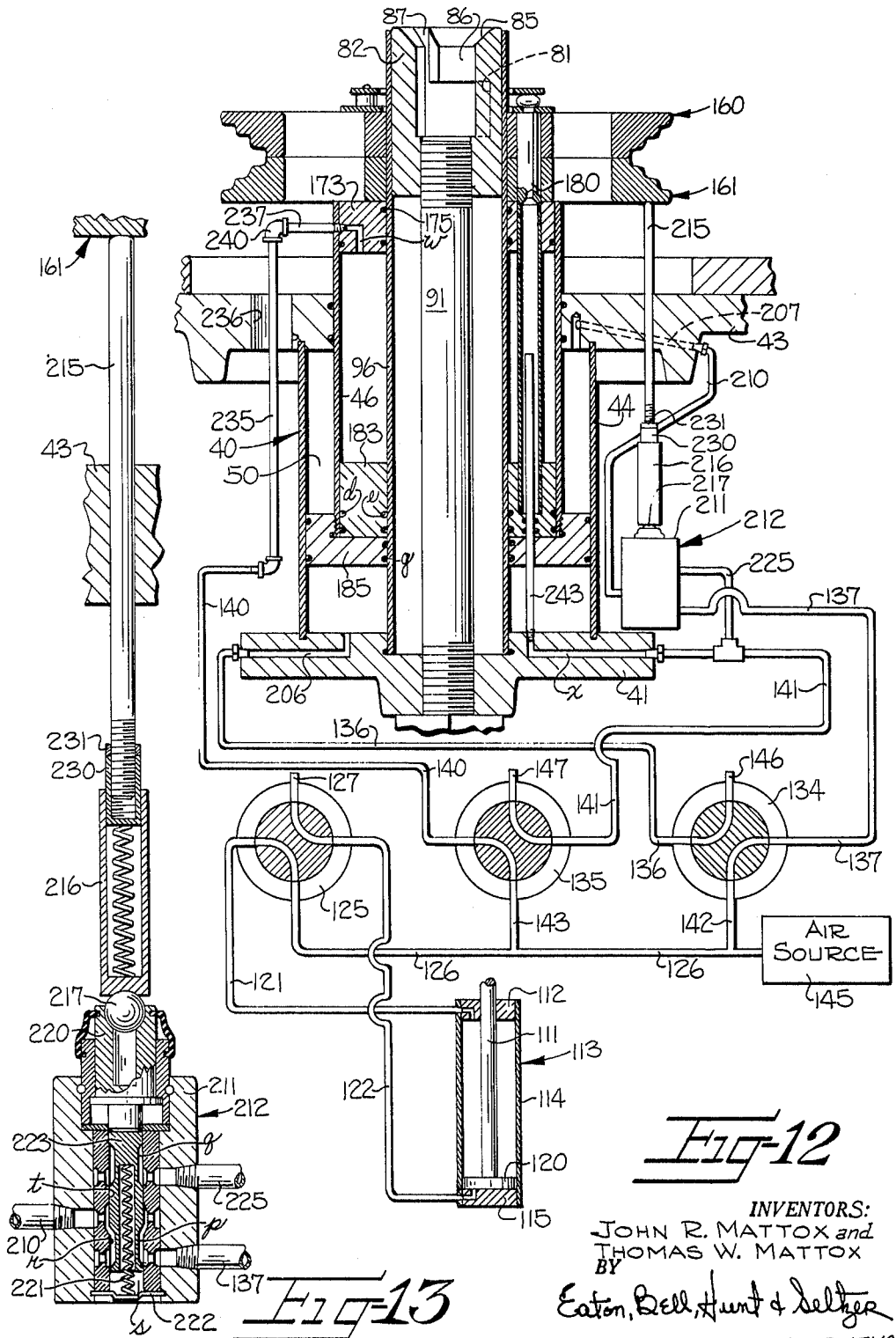

3,240,653
RETREADING APPARATUS FOR TIRES
John R. Mattox, Rte. 3, Shopton Road, and Thomas W.
Mattox, 7205 Marley Circle, both of Charlotte, N.C.
Filed Dec. 3, 1962, Ser. No. 241,624
21 Claims. (Cl. 156—398)

This invention relates to an apparatus for recapping and/or retreading pneumatic tires, and more especially, to an improved mold stand for supporting a continuous or full circle matrix and including novel mechanism for inserting a tire casing with the tread strip thereon in a matrix and removing the tire casing from the matrix following the curing of the tire casing.

The full circle type of matrix with which the present apparatus is particularly adapted to be used is substantially as disclosed in United States Patents Nos. 2,267,243 and 2,475,579 and includes a tread face on its inner periphery with tapered annular flanges on opposite sides thereof for engaging and clamping opposed sidewalls of the tire casing during the curing operation. At least one of said flanges must be removable to facilitate inserting a tire casing in and withdrawing a tire casing from the matrix. These flanges must be unyieldably and securely clamped against the matrix during the curing operation.

Therefore, mold matrices of the type described are used with a mold machine or mold stand having generally vertically movable and pneumatically operable upper clamping member which is moved against the removable upper flange of the matrix after the casing has been inserted therein and during which the matrix rests upon a platform serving as a bottom clamping member. As the upper clamping member is moved against the upper flange on the matrix, a centrally disposed anchor shaft is passed through the tire casing and is anchored to the base of the mold stand, whereupon a large nut threadedly mounted on the anchor shaft is tightened against the upper clamping member to tightly secure the matrix and its flanges together between the upper and lower clamping members.

Heretofore, a fluid-pressure-operated tire-diameter reducing mechanism, or bead spreader, completely separate from the mold machine, has been employed for inserting tire casings in full circle matrices, thus requiring considerable labor and the use of an expensive mechanical hoisting device for handling the tire-diameter reducing mechanism, notwithstanding the fact that additional floor area had to be available adjacent each mold machine to accommodate the tire-diameter reducing mechanism. The tire-diameter reducing mechanism had to be removable from the mold machine heretofore because the fluid pressure cylinder thereof would necessarily occupy a position between the centrally disposed anchor shaft and the anchor means therefor carried by the base of the mold machine.

It is therefore an object of this invention to provide an improved tire recapping apparatus in which a novel fluid-pressure-operated tire-diameter reducing mechanism is so combined with a mold machine of the character described that it need not be removed from the mold machine and it will not interfere with the connection of the centrally disposed anchor shaft to the anchor means carried by the base of the machine.

It is another object of this invention to provide an improved combination mold stand and tire-diameter reducing mechanism for full circle matrices of the character heretofore described and wherein the tire-diameter reducing mechanism is so constructed as to readily accommodate the lower portion of the aforementioned anchor shaft with the matrix-supporting platform or lower clamping member being supported on a cylinder forming a part of the tire-diameter reducing mechanism so that the lower clamping member is supported on a relatively low level such that an operator may readily install matrices on and remove matrices from the platform with a minimum of effort and without the necessity of utilizing other means, such as an electric hoisting mechanism, for this purpose.

It is another object of this invention to provide tire retreading apparatus of the character described in which the tire-diameter reducing mechanism comprises upper and lower bead compressing or contracting members, preferably in the form of wheels, which have openings in the central portions thereof to accommodate said anchor shaft and which are supported for relative axial movement and are raised and lowered by fluid-pressure-operated annular pistons which encircle the vertical plane of the anchor means carried by the base of the machine. Further, the upper compressing member may be raised and lowered independently of the lower compressing member by manipulation of one control device or valve, and both the upper and lower compressing members may be raised and lowered in unison by manipulation of another control device or valve, thus facilitating vertical movement of the tire casing into and out of the matrix without accidentally varying the relative positions of the compressing members with respect to each other.

It is still another object of this invention to provide apparatus of the type last described which includes novel means for automatically stopping downward movement of the tire casing and the bead compressing members upon the tire casing beig lowered a predetermined distance into the matrix and so that the median center of the periphery of the casing may be automatically alined with the median center of the tread face of the mold matrix.

Some of the objects having been stated, other objects will appear as the description proceeds when taken in connection with the accompanying drawings, in which—

FIGURE 1 is a front elevation of the improved mold stand showing the upper matrix clamping member in operative position clamping a mold matrix against the lower matrix clamping member or main platform;

FIGURE 2 is an enlarged fragmentary sectional plan view taken substantially along line 2—2 in FIGURE 1;

FIGURE 3 is a side elevation looking at the right-hand side of FIGURE 1, but showing the upper matrix clamping member in raised or inoperative position and also showing the upper bead compressing member or wheel removed from the apparatus;

FIGURE 4 is a top plan view of the upper bead compressing member shown in the upper portion of FIGURE 6, but being removed from the mold stand or machine;

FIGURE 5 is a partially exploded perspective view of the upper bead compressing member shown in FIGURE 4;

FIGURE 6 is a vertical sectional view taken substantially along line 6—6 in FIGURE 2, but showing the lower bead compressing member in raised position above the matrix with the upper bead compressing member spaced substantially above a tire casing supported on the lower bead compressing member;

FIGURE 7 is a view similar to FIGURE 6, but being taken substantially along line 7—7 in FIGURE 2 and showing the beads of the tire casing clamped between the outer portions of the bead compressing members and also showing the same in a substantially lowered position with the tire casing and tread strip substantially alined with the median center of the tread surface on the inner periphery of the matrix;

FIGURES 8 and 9 are fragmentary vertical sectional views taken substantially along lines 8—8 and 9—9, respectively, in FIGURE 2, to illustrate the corresponding passageways for admitting fluid pressure into and exhausting fluid pressure from corresponding chambers of a composite cylinder and piston assembly;

FIGURE 10 is a view similar to FIGURES 6 and 7, but being taken substantially along line 10—10 in FIGURE 2 and showing the positions occupied by the various movable elements of the apparatus during the curing of the tread strip on the tire casing;

FIGURE 11 is an inverted sectional plan view taken substantially along line 11—11 in FIGURE 10;

FIGURE 12 is a schematic illustration showing a preferred fluid pressure circuit for the apparatus of the present invention and wherein the various fluid pressure passageways are shown in somewhat different relative positions than they appear in other figures of the drawings for purposes of clarity;

FIGURE 13 is a fragmentary vertical sectional view taken substantially along line 13—13 in FIGURE 7 and showing a preferred means for automatically terminating forced downward movement of the bead compressing or clamping members and the tire casing carried thereby during the insertion thereof in the matrix so that the horizontal median center of the tire casing is alined with the corresponding median center of the mold matrix.

The present tire recapping and/or retreading machine or mold stand is particularly designed to be used in association with matrices substantially of the type disclosed in said U.S. Patents Nos. 2,267,243 and 2,475,579 for recapping and/or retreading pneumatic tire casings such as the casing C shown in cross-section in FIGURES 6, 7 and 10, and to which a tread strip C-1 has been adhesively applied. During the curing operation the tire casing encloses an inflatable inner tube T and a sectional curing rim R which is arcuate in cross-section. A valve stem T-1 on inner tube T loosely extends through curing rim R and has a flexible tubular valve stem extension T-2 connected thereto for ease in admitting compressed air into and releasing compressed air from the inner tube T.

The conventional outer mold matrix, broadly designated at 20, comprises an undivided full circle or annular metallic heat transmitting mold member or body 21 whose inner periphery forms a curved inner tread face with projections 23 thereon forming the tread design. The outer periphery of mold member 21 has an electric heating element 24 in close proximity thereto (FIGURE 1) which is connected to a suitable thermostatically controlled switch 25 carried by an annular outer wall member or shell 26 which encircles mold member 21 in spaced relation thereto. Although mold member 21 is shown as being electrically heated in the present drawings, it is to be understood that any suitable means may be provided for heating the mold member 21.

Heating element 24 is enclosed in an annular box comprising flat upper and lower rings 27, 28 to the outer peripheral edges of which the outer wall or shell 26 is suitably secured. The space between mold member 21, wall 26 and upper and lower rings 27, 28 may be filled with a suitable heat-insulating material, such as rockwool or the like. Rings 27, 28 are usually made from a non-metallic material, such as wood, fiberboard, or the like. Thermostatically controlled switch 25 has wires or conductors 31 extending therefrom which may be connected to a suitable source of electrical energy not shown.

Mold member 21 is provided with a lower annular side flange 35 which extends inwardly beyond the peaks of the projections or ridges 23 and may be formed integral with mold member 21 or fitted in the lower portion thereof as best shown in FIGURES 6, 7 and 10. The upper inner edge of mold member 21 also has a peripheral rabbet or groove 36 therein in which a removable annular upper side flange 37 may be freely seated. Since the removable upper flange 37 must be clamped in groove 36 during the curing process, the depth of groove 36 should be slightly less than the thickness or height of flange 37 at the outer portion thereof. The flanges 35, 37 extend inwardly for a distance which defines the inner limit of the molding chamber.

It should be noted that the inner diameter of the mold member 21 measured between the tops of the ridges or projections 23 is less than the diameter of the casing C with the uncured tread strip C-1 attached, so as to avoid stretching the casing in the curing operation and to make the tread strip fill the mold thus formed. However, the mold member is of sufficiently large diameter to encompass the casing C with tread strip attached without compressing the casing when the thickness of the tread strip has been reduced by the flow of part of the substance thereof into the grooves between the ridges or projections 23 to fill the same so that, in the finished uninflated tire, the casing is not circumferentially constricted by the tread strip while the latter will not be under undue tension when the tire is inflated. Accordingly, the mold stand or machine of the present invention includes means for reducing the external diameter of the tire casing C and inserting the same thus reduced in the matrix 20 before the curing operation and for reversing this procedure when the tire casing with the cured tread strip thereon is removed from the matrix 20.

The improved retreading machine or mold stand comprises a main frame or supporting structure broadly designated at 40 and including a main base 41 provided with legs 42 which are adapted to rest upon the floor F. Supported in spaced relation above the base 41 is a main platform or lower matrix clamping member 43.

Since the tire-diameter-reducing mechanism of the present invention is combined with the mold stand, a relatively large main external cylinder 44 is provided between base 41 and main platform 43 and serves to support the main platform 43 in spaced relation above base 41. In fact, the base 41 also serves as a closure or base for the lower end of cylinder 44 and the main platform 43 serves as a partial closure for the upper end of cylinder 44. The proximal surfaces of base 41 and platform 43 are suitably grooved for receiving opposed ends of cylinder 44 therein. The central portion of main platform 43 is provided with a relatively large circular opening 45 therein through which an inner or secondary cylinder 46 extends for vertical movement therethrough. It is necessary that the opening 45 is so located that an imaginary line corresponding to the axis of the matrix 20 extends through the opening 45. As shown in FIGURES 6, 7 and 10, opening 45 is substantially circular and substantially concentric with the axis of mold member 21 of matrix 20. The peripheral wall of opening 45 is preferably provided with suitable resilient annular seals or O-rings 47 which are engaged by the outer surface of inner cylinder 46 to minimize or prevent leakage of compressed air or fluid pressure from a chamber 50 defined between the outer and inner cylinders 44, 46.

In order to tightly secure the outer cylinder 44 between base 41 and main platform 43, a plurality of circularly spaced tie rods 52 are arranged around and in closely spaced relation to the outer surface of main cylinder 44. The upper ends of tie rods 52 are threaded into main platform 43 and the lower portions thereof loosely extend through base 41 and are secured thereto by suitable washers and nuts 53, 54, which nuts are threaded onto the lower ends of tie rods 52.

Since main platform 43 is of substantially greater diameter than base 41 in the present instance (although the base 41 need not necessarily be circular), the outer portions of the main platform 43 are suitably anchored to main base 41. In this instance, the outer periphery of the main platform 43 has three equally spaced relatively small plates 56 suitably secured thereto and depending therefrom, to each of which the upper end of an extensibly adjustable connecting rod 57 is suitably connected. The lower end of each connecting rod 57 is suitably secured to a corresponding leg 42 of base 41. In this instance each connecting rod 57 is shown in the form of two alined rod sections whose threaded proximal ends are interconnected by a suitable turnbuckle 61.

Since the main platform 43 is preferably cast from metal and it is desirable that the heat of the mold matrix 21 is not transmitted to platform 43, platform 43 has an annular main platform insulation ring 62 suitably secured to the upper surface thereof. This lower ring 62 also serves as a portion of the clamping surface of the main platform 43 and is preferably made from wood, fiberboard or other suitable heat-insulation material. The external diameter of insulation ring 62 should be only slightly less than the internal diameter of the bottom ring 28 of matrix 20 so that ring 28 will encircle ring 62 when matrix 20 is positioned on the mold stand and, thus, the mold stand ring 62 serves to centrally locate the matrix 20 with respect to the vertical axis of cylinders 44, 46. It will be noted that a substantial portion of the lower surface of bottom flange 35 then rests upon the mold stand ring 62.

During the curing operation, the upper annular flange 37 of matrix 20 is clamped in the groove 36, and matrix 20 is clamped against platform 43 by an upper main or matrix clamping member broadly designated at 70 and which may also be termed as a turret. Upper matrix clamping member 70 comprises an annular clamping ring 71 which may bear directly against the upper surface of the upper flange 37 of matrix 20. However, it is preferable that an upper insulation mold stand ring 72 is secured to the lower surface of clamping ring 71 for the same reason that the lower insulation ring 62 is provided. The upper clamping ring 71 has cast integral therewith the outer ends of a plurality of radal spokes or arms 73 which curve upwardly and inwardly and are connected to a turret hub or clamping member hub 74 preferably cast integral with spokes 73.

A center post or matrix clamping shaft 75 is loosely mounted for axial movement in, and penetrates the hub 74 of, clamping member 70 and is threaded at its upper end for the reception of a relatively large clamping nut 76. Clamping nut 76 may be provided with a pair of handles 77 to facilitate tightening said nut against the upper end of hub 74 when a pair of diametrically opposed key portions 80 (FIGURES 3 and 10) at the lower end of clamping shaft 75 is positioned in the cavities 81 (FIGURE 11) of a bayonet slot formed in an anchor block or hub 82 positioned in substantially the same horizontal plane as matrix 20.

It will be observed in the central portion of FIGURE 10 that anchor block 82 has a frusto-conical cavity 85 in the upper end thereof for piloting the free lower end of clamping shaft 75 into a substantially circular bore 86 (FIGURE 11) at which said bayonet slot is formed. As shown in FIGURE 11, the circular bore 64 is provided with key slots 87 at opposite sides thereof through which the keys 80 on the lower end of clamping shaft 75 are inserted whenever shaft 75 is lowered from a raised, inoperative position to enter the cavities 81 in the lower portion of anchor block 82. Cavities 81 are shown as being substantially quarter-circular in FIGURE 11. In order to rotate shaft 75 after the keys 80 thereon have been positioned in circular alinement with cavities 81, the upper end of clamping shaft 75 may be provided with a handle 90. It is apparent that the operator may utilize the handle 90 for rotating the clamping shaft 75 substantially a quarter-revolution to lock keys 80 in the cavities 81 of the bayonet slot. The handle 90 may also serve as an indicator to the operator as to the position of the keys 80 at the lower end of shaft 85.

Anchor block 82 is secured in fixed relation to main base 41 of the mold stand by means of a substantially vertical, axially disposed, anchor block post, column or shaft 91 (FIGURE 10). The upper end of shaft 91 is threaded into the lower portion of anchor block 82, and the lower end of shaft 91 penetrates the central portion of base 41 and has a relatively large nut 92 threaded thereon. The upper and lower ends of shaft 91 may also be keyed in anchor block 82 and main base 41, as at 93 and 94, in order to insure that anchor block 82 is maintained in a fixed position with respect to the main base 41.

In order to accommodate shaft 91 and anchor block 82, the various pistons and cylinder closures circumscribed by the main cylinder 44, and which will be later described, encircle a substantially vertically disposed and axially positioned core tube 96 whose upper portion encircles anchor block 82, and whose remaining portion encircles the shaft 91. The lower end of tube 96 is threaded into a shallow cavity 97 formed in the upper central portion of main base 41. A suitable resilient sealing ring or O-ring 100 is preferably provided between the lower end of core tube 96 and the bottom portion of the wall of cavity 97.

Since core tube 96 is primarily provided to seal the interiors of the cylinders 44, 46 against leakage of air or fluid pressure around anchor shaft 91, tube 96 is preferably made from relatively light or thin material. Thus, the manner in which anchor block 82 is attached to main base 41 through the medium of shaft 91 obviates the necessity of securing anchor block 82 to core tube 96 and prevents undue strain from being placed upon core tube 96 when upper clamping member 70 occupies the position of FIGURE 10 and nut 76 is tightened against hub 74.

In order to raise and lower the upper main clamping member 70 and to simultaneously raise and lower shaft 75 and nut 74 between the positions shown in FIGURES 1 and 3, each of a pair of diametrically opposed spokes 73 has a pair of closely spaced upwardly projecting portions 100, preferably cast integral therewith and disposed intermediate the ends thereof, to which the front ends of a pair of levers 101 are pivotally connected, as at 102. Levers 101 extend rearwardly and are fulcrumed on a transverse shaft 103 mounted in the upper end of a bifurcated standard or pedestal 104. Pedestal 104 extends downwardly and is suitably secured to the upper surface of an auxiliary base or rear deck 105 which rests upon the floor F and also extends forwardly and is suitably secured to the lower surface of main platform 43.

Levers 101 extend rearwardly beyond pedestal 104 and have opposite ends of a clevis shaft 107 mounted therein on which a clevis 110 is pivotally mounted. Clevis 110 is fixed on the upper end of a piston rod 111 which extends downwardly and slidably penetrates the head 112 of a double-acting cylinder assembly or ram broadly designated at 113. Cylinder assembly 113 also comprises a cylinder tube 114 to which the upper end of cylinder head 112 is secured and to the lower end of which a cylinder base 115 is suitably secured. Cylinder base 115 is fulcrumed on a shaft 116 carried by a cylinder pivot block 117 which extends forwardly and is suitably secured to the rear surface of rear deck 105. The lower end of piston rod 111 is fixed to a piston 120 mounted for longitudinal sliding movement in cylinder tube 114 (FIGURE 12).

Cylinder head 112 and cylinder base 115 have respective flexible pipes or conduits 121, 122 connected thereto for communication with the interior of cylinder tube 114. The ends of the flexible pipes 121, 122 remote from cylinder assembly 113 are communicatively connected to opposed sides of a main manually operable matrix-clamping four-way valve 125 to which an air inlet or fluid pressure inlet pipe or conduit 126 is also connected (FIGURES 1 and 12). Valve 125 is also provided with a discharge or exhaust port or passageway 127.

It will be observed in FIGURE 1 that four-way valve 125 is suitably secured upon the foot portion 130 of a substantially upright control support frame 131, the foot 130 of which rests upon floor F. Thus valve 125 is conveniently located so as to be operated by the foot of the operator, if desired. A medial portion of control support frame 131 has an inwardly projecting arm 132 thereon suitably secured to the lower surface of main platform 43. The upper end of control support frame 131 also has the housings of a pair of four-way valves 134, 135 fixed thereon within easy reach of the hands of the operator. The four-way valves 134, 135 are provided for controlling the bead compressing members of the tire-diameter-reducing mechanism to be later described.

Opposed sides of the four-way valves 134, 135 have respective pairs of flexible pipes or conduits 136, 137 and 140, 141 communicatively connected thereto (FIGURE 12). Valves 134, 135 also have respective inlet pipes or conduits 142 connected thereto whose other ends are connected to medial portions of inlet pipe 126. The end of inlet pipe 126 opposite from valve 125 is connected to a suitable source of fluid pressure, preferably compressed air, which is labeled as an air source 145 in FIGURE 12. Valves 134, 135 are also provided with respective discharge ports or outlets 146, 147. It will be observed in FIGURE 1 that valves 125, 134, 135 are provided with respective operating handles $a$, $b$, $c$ which are provided for manually rotating the cores of the respective valves 125, 134, 135.

It is apparent by referring to FIGURE 12 that, when the core of valve 125 occupies the position shown, compressed air or fluid pressure is directed through valve 125 to the upper end of cylinder assembly 113 as it is exhausted from the lower end thereof. When the core of valve 125 is moved a predetermined distance in a clockwise direction in FIGURE 12, it is apparent that this reverses the flow of air through the conduits 121, 122, since conduit 121 will then communicate with outlet 127 and conduit 122 will then communicate with inlet pipe 126. It is thus seen that the upper main clamping member 70 may be raised and lowered by moving the control handle $a$ of valve 125 a given distance in the desired direction. By moving handle $a$ to an intermediate position the clamping member 70 may be stopped in any desired position.

Since valves 134, 135 have flexible conduits or pipes connected thereto which extend to the pipe 126 and other parts of the machine, it is desirable to provide an enclosure 150 adjacent the housings of valves 134, 135 on the upper end of control frame 131. The enclosure 150 is in the form of an open ended substantially rectangular tube, one open end of which is fixed on the upper end of control frame 131. Enclosure 150 extends substantially rearwardly and then downwardly and terminates on a level substantially corresponding to the level of the main platform 43.

As heretofore stated, the tire-diameter-reducing mechanism comprises a pair of upper and lower bead compressing, clamping or contracting members. These bead compressing members are indicated at 160, 161 in FIGURES 4 to 10 and 12. Each of the bead compressing members 160, 161 is shown in the form of a wheel or circular plate, although it is apparent that the bead compressing members 160, 161 may be in the form of circularly spaced arcuate segments, without departing from the spirit of the present invention.

In this instance, the upper and lower bead compressing members 160, 161 comprise respective annular rims or bodies 162, 163 whose proximal peripheral portions are provided with respective groups of stepped or shouldered surfaces 164, 165 to accommodate tire casings of varying internal diameters. The annular rims 162, 163 are connected to respective annular hubs 166, 167 by respective circularly spaced spokes 170, 171. The hubs 166, 167 are adapted to be loosely penetrated by core tube 96.

The lower or bottom bead compressing member 161 rests upon and is suitably secured to an annular piston 173, as by screws 174. Piston 173 serves as a cylinder head and is fixed in the upper end of cylinder 46. Thus, cylinder 46 serves as an axially movable support element for tire-bead-engaging member 161. Since the cylinder head 173 moves upwardly and downwardly relative to core tube 96, suitable resilient sealing rings or O-rings 175 are positioned in suitable grooves formed in the inner periphery of cylinder head 173 and move in sliding engagement with core tube 96.

The cylinder head 173 and the hub 167 of lower bead compressing member 161 are slidably penetrated by a plurality of circularly spaced posts 180, there being three such posts shown in FIGURES 2, 3, 6, 7, 10 and 12. The lower ends of posts 180 are suitably secured to an annular inner piston 183, as by being threaded thereinto. Annular piston 183 is mounted for vertical sliding movement within inner cylinder 46 and around core tube 96. Suitable resilient sealing rings or O-rings $d$, $e$ may be provided in piston 183 for engaging the inner surface of cylinder 46 and the outer surface of core tube 96, respectively, to prevent leakage of fluid pressure past piston 183.

The lower end of inner or secondary cylinder 46 is threadedly connected to a relatively large main annular piston 185 mounted for vertical sliding movement within main cylinder 44 and around core tube 96. Accordingly, the outer and inner peripheries of main annular piston 185 may be provided with suitable resilient annular seals or O-rings $f$, $g$ to prevent leakage of air or fluid pressure past the main piston 185.

The upper bead compressing member 160 is removably mounted on the upper ends of the posts 180 and, in order to facilitate quick attachment of the upper bead compressing member 160 to the upper ends of posts 180 and quick removal of the upper compressing member from said posts, it will be observed in FIGURES 4 and 5 that the hub 166 is provided with three circularly spaced arcuate slots 187 therethrough which are adapted to loosely receive the upper ends of the corresponding posts 180.

As best shown in FIGURES 3, 6 and 12, the upper end of each vertically movable post 180 has a round headed screw 190 threaded thereinto, with the head thereof being spaced a predetermined distance above the upper end of the corresponding post. In order to secure the screws 190 in the desired position, each screw may be locked in the corresponding post, as by a set screw 191 (FIGURE 6). The heads of the screws 190 serve as shoulder members on the upper ends of the posts 180 and the shoulders and caps formed by the screws 190 may be formed as integral parts of the corresponding posts 180.

An annular plate 193, suitably secured to the upper surface of the hub 166 of upper bead compressing member 160 (FIGURES 3 and 4), is provided with three circularly spaced bayonet slots 194 which are in registration with the respective arcuate slots 187 in hub 166. The large ends of the bayonet slots 194 are adapted to freely receive the heads or caps of screws 190 on the upper ends of the corresponding posts 180, while the smaller portions of the bayonet slots 194 are adapted to loosely receive the shanks of the screws 190. Thus, while the upper bead compressing member 160 is being mounted on the posts 180 the large ends of the bayonet slots 194 are alined with the caps of the screws 190, after which the upper bead compressing member 160 is turned a small amount so the portions of the plate 193 defining the smaller portions of the bayonet slots 194 retain the upper bead compressing member 160 on the upper ends of the posts 180.

It will be observed in FIGURE 7 that the inner or post actuating piston 183 bears against the upper surface of main piston 185 when the beads of the tire casing C are tightly clamped between corresponding shoulders or steps 164, 165 on the bead compressing members 160, 161. However, it may be desirable to space the shoulders 164, 165 further apart when the bead compressing members 160, 161 are used for clamping the beads of a tire casing of lesser diameter than that shown in FIGURE 7, for example, in which instance, the screws 190 on the upper ends of the posts 180 would be adjusted outwardly or upwardly with respect to the posts. Therefore, in order to facilitate the quick mounting of the upper bead compressing member 160 on the post 180 while maintaining the upper surface of plate 193 in close proximity to the lower surfaces of the heads of the screws 190, an annular limiting plate 196 is suitably secured to plate 193 with suitable spacers 197 being provided between the proximal surfaces of plates 193, 196.

Plate 196 overlies bayonet slots 194 and is adapted to engage the upper surfaces of the heads of the screws 190 as the screws 190 are being inserted in the corresponding bayonet slots 194. In this instance, the plates 193, 196 are held in fixed relation to the hub 166 of upper bead compressing member 160 by suitable screws 200 which penetrate the upper plate 196, the spacers 197 and the lower plate 193 and are threaded into the hub 166 of bead compressing member 160. Although the bayonet slots 194 may be formed in the hub 166 per se, it has been found more practicable to form the bayonet slots in the manner heretofore described.

Before a tire casing C with tread strip C-1 thereon is inserted in matrix 20, an inner tube or air bag T is positioned within tire casing C and the curing rim R is positioned between the side walls of the tire casing C. Since it is necessary to inflate the inner tube T with compressed air after the tire casing C with tread strip C-1 thereon is inserted in the matrix 20 as shown in FIGURE 7, for example, the valve stem extension T-2 should extend upwardly between adjacent spokes 170 of the upper bead compressing member 160 so that a conventional compressed air hose may be connected thereto. Accordingly, the proximal portions of the annular rims 162, 163 of upper and lower bead compressing members 160, 161 are provided with respective radially extending grooves $m$ and $n$ (FIGURE 6) through which the valve stem extension tube T-2 extends when the beads of the corresponding tire casing C are clamped between the bead compressing members 160, 161 (FIGURE 7).

In order to prevent rotation of bottom bead compressing member 161, cylinder head 173, pistons 183, 185, cylinder 46, posts 180 and upper bead compressing member 160, the upper end of a guide rod 202 (FIGURE 7) is suitably secured to the annular body 163 of compressing member 161, and a medial portion of rod 202 penetrates and is guided for vertical sliding movement in main platfrom 43.

In operation, the upper and lower bead compressing members 160, 161, or the posts 180, and the lower bead compressing member 161 are raised and lowered simultaneously by admitting fluid pressure or compressed air into the lower end of main cylinder 44 or into the chamber 50 above main piston 185, as the case may be. To this end, it will be observed in FIGURE 12 that conduit 136 extends from one side of four-way valve 134 to the main base 41, to which pipe or conduit 136 is connected for communicating with the lower end of cylinder 44 through a passageway 206 (FIGURES 2, 8 and 12). It is apparent that the core of valve 134 is rotated by manipulation of the corresponding handle $b$ (FIGURE 1) to establish communication between inlet pipe 142 (FIGURE 12) and pipe 136 to admit compressed air or fluid pressure into main cylinder 44 beneath main piston 185, and this will cause piston 185 to move upwardly until either its upper surface engages the lower surface of main platform 43, as shown in FIGURE 6, or until the core of valve 134 is again rotated to interrupt communication between any of the conduits 136, 137, 142, 146.

As main piston 185 moves upwardly in the manner last described, air is exhausted from chamber 50 above piston 185 through a passageway 207 formed in main platform 43 (FIGURES 6 and 12). One end of a pipe or conduit 210 is connected to main platform 43 for communication with passageway 207. The other end of conduct 210 is connected to one side of the housing 211 of a safety pilot valve broadly designated at 212 (FIGURES 2, 7, 12 and 13), the purpose of which will be later described.

Pilot valve 212 normally maintains communication between conduit 210 and conduit 137 which is also connected to housing 211. As heretofore stated, conduit 137 extends from one side of four-way valve 134. Since the core of valve 134 is so positioned that communication is established between discharge outlet 146 and pipe 137 whenever it establishes communication between conduits 142, 136 for raising the main piston 185, it is apparent that air is exhausted from the conduit 210, valve 212 and conduit 137 through the discharge outlet 146.

As piston 185 is moved upwardly in the manner heretofore described, it is apparent that the inner cylinder 46, the cylinder head 173, piston 183 and posts 180 also move upwardly in fixed relation to main piston 185. Thus, regardless of the relative positions of the two bead compressing members 160, 161, they move upwardly unitarily with main piston 185.

Since pilot valve 212 (FIGURES 12 and 13) normally maintains communication between pipes 137, 210, it is apparent that when the core of valve 134 occupies the position shown in FIGURE 12, compressed air or fluid pressure flows into the upper end of the cylinder 44 and, thus, into the chamber 50 defined between cylinders 44, 46, thus causing main piston 185, cylinder 46, piston 183, posts 180 and both bead compressing members 160, 161 to move downwardly therewith. Of course, during the course of any downward movement of main piston 185, air is exhausted from the lower end of cylinder 44 through passageway 206, conduit 136, valve 134 and outlet 146.

The safety pilot valve 212 is provided to automatically stop the flow of compressed air or fluid pressure into chamber 50 whenever the median center of the tire casing C whose beads are then clamped by the bead compressing members, is alined with the median horizontal center of matrix 20. Accordingly it will be observed in FIGURES 7, 12 and 13 that, upon the lower bead compressing member 161 reaching a predetermined position or level in the course of downward movement thereof, it engages the upper end of a sensing rod or pilot valve control rod or shaft 215 which loosely penetrates main platform 43 and is telescopically connected to a pilot valve control rod extension 216. The lower end of extension 216 bears against a ball 217 carried by the normally upwardly extended control plunger 220 of pilot valve 212.

Plunger 220 is guided for vertical movement in the housing 211 of valve 212 and is normally biased upwardly to a limited extent by a compression spring 221 whose lower end bears against a valve base 222 and whose upper end extends into, and bears against a shouldered medial portion of, a vertically movable valve core 223 guided for vertical movement in the housing 211 of pilot valve 221. Since various types of pilot valves may be used for the intended purpose, only so much of the pilot valve 212 will be described as is necessary to a clear understanding of the invention and a description of many details thereof will thus be omitted. The pilot valve shown in FIGURE 13 is of a type such as is, for example, disclosed in a catalogue No. 263, dated February 1961, by Hanna Engineering Works, 1765 Elston Avenue, Chicago 22, Illinois, and is identified in said catalogue as a Ball Cam Model C3C FLOW PILOT 3-way pilot valve.

In this instance, the core 223 of pilot valve 212 has a pair of longitudinally spaced reduced annular portions $p$, $q$ thereon and, when core 223 is in its normally raised position, reduced portion $p$ thereof registers with a restriction $r$ in the central bore $s$ of valve housing 211 and, in so doing, the valve core 223 maintains communication between conduits 137, 210. On the other hand, when control plunger 220 of valve 212 is moved downwardly to the limit permitted and moves the core 223 downwardly therewith, the reduced upper portion $q$ of core 223 registers with another restriction $t$ spaced above restriction $r$ and, at the same time, the core 223 fills the restriction $r$. When the reduced portion $q$ is in registration with the restriction $t$, communication is maintained between conduit 210 and a pipe or conduit 225 which, as shown in FIGURE 12, is communicatively connected to a medial portion of conduit 141 extending from valve 135. The restrictions $r$ and $t$ straddle the opening to pipe 210 so that, when the valve core 223 occupies its normally raised position, the restriction $t$ is filled or closed by core 223.

It is thus seen that, upon the upper end of sensing rod 215 being engaged and moved downwardly by the lower bead compressing member 161, the valve control plunger 220 and valve core 223 are moved downwardly therewith, thus permitting compressed air to escape from chamber 50 between cylinders 44, 46, since the core of valve 135 must then occupy the position shown in FIGURE 12 and compressed air is discharged from pilot valve 212 through conduits 225, 141, valve 135 and outlet 147 to the atmosphere.

Now, after the tire casing C, with tread strip C-1 thereon, has been inserted in the matrix 20 preparatory to the curing operation, it is apparent that the upper bead compressing member 160 must move upwardly and the lower bead compressing member 161 must move downwardly to release the beads of the tire casing C and permit the tire casing C and its tread strip to expand against the inner periphery or tread face of the full circle mold member 21. It should be noted that since control valve 135 permits air to escape from beneath piston 185 in cylinder 44, even after the sensing rod 215 has been engaged by the lower bead compressing member 161, the bead compressing members 160, 161 would continue to move downwardly to lowermost position, until main piston 185 engaged the upper surface of the main base 41 as shown in FIGURE 10, if it were not for the fact that the tire casing C is then resting upon lower flange 35 (FIGURE 7), upper bead compressing member 160 is then supported by the upper bead of the tire casing C, and both beads of the tire casing are still clamped between the bead compressing members 160, 161.

In order to permit adjustment of sensing rod 215 to vary the position the upper end thereof may occupy in accordance with variations in the widths of the tire casings whose beads may be compressed by the bead compressing members 160, 161 and to also permit the rod 215 to be moved downwardly following the downward movement of the control plunger 220 of pilot valve 212 to the extent permitted by engagement of the core 223 with the valve base 222, for example, the lower end of sensing rod 215 is threaded into an internally threaded tubular guide 230 (FIGURE 13) and is locked in the desired adjusted position therein by a lock nut 231.

Tubular guide 230 is guided for longitudinal or vertical movement in an elongate cavity $u$ formed in the rod extension 216. A compression spring 232 is loosely positioned in cavity $u$ and the upper end thereof bears against the lower end of tubular guide 230. The lower end of spring 232 bears against the bottom of cavity $u$.

The spring 232 is of sufficient strength so that it is compressed very little, if at all, in the absence of any external force, such as the lower bead compressing member 161, applying downward pressure to sensing rod 215. Further, compression spring 232 is substantially stronger than compression spring 221 in valve housing 211 and compression spring 221 is also of sufficient strength to maintain control plunger 220 and ball 217 of pilot valve 212 in fully extended or raised position while supporting the sensing rod 215, its extension 216, spring 232, tubular guide 230 and nut 231 thereon. Thus, as the lower bead compressing member 161 moves downwardly and engages the upper end of sensing rod 215, it initially imparts a relatively small amount of downward movement to sensing rod 215, its extension 216, the ball 217 and control plunger 220 of valve 212, and moves the core 223 of valve 212 downwardly to interrupt communication between pipes 137 and 210 while establishing communication between pipes 225 and 210.

As heretofore stated, if the beads of a tire casing are then clamped between the bead compressing members 160, 161, the piston 185 and all the parts supported thereby will then remain in substantially the position they occupied at the time that the core 223 of pilot valve 212 was moved downwardly, even though air may be exhausted from the bottom of cylinder 44 through passageway 206 (FIGURES 8 and 12) conduit 136, valve 134 and outlet 146. However, if upper bead compressing member 160 is then moved upwardly away from the upper bead of the corresponding tire casing, there is no longer any substantial support provided for the lower bead compressing member 160 so the piston 185 and parts supported thereby will then move downwardly until the lower surface of piston 185 engages the upper surface of main base 41.

Now, in order to raise and lower the upper bead compressing member 160 relative to the lower bead compressing member 161, means are provided for alternatively admitting compressed air or fluid pressure into the upper and lower ends of the inner cylinder 46. Accordingly, it will be observed in FIGURES 2, 9 and 12 that the end of flexible pipe or conduit 140 opposite from manual control valve 135 is connected to the lower end of a rigid pipe or conduit 235 which extends upwardly and loosely extends through an opening 236 provided in main platform 43. The upper end of pipe 235 is coupled to a relatively short pipe or conduit 237 by means of a pipe elbow 240. The other end of pipe 237 is communicatively connected to a passageway $w$ formed in cylinder head 173 and which effects communication between pipe 237 and the upper end of cylinder 46. It should be noted that pipe 235 is rigid and conduit 140 is flexible, since pipe 235 moves upwardly and downwardly relative to main platform 43 with inner cylinder 46.

Referring again to FIGURES 6 and 12, it will be observed that the end of conduit 141 opposite from manually operable control valve 135 is connected to main base 41 for communication with a passageway $x$ which extends inwardly where it terminates adjacent core tube 96. However, instead of communicating with the interior of the cylinder 44 beneath main piston 185, the passageway $x$ communicates with the lower end of an upstanding, open-topped, pressure conveying pipe or tube 243 suitably secured to main base 41 and whose upper end terminates on a level higher that that to which the main piston 185 can move (FIGURE 6). Since tube 243 is stationary, it slidably penetrates a medial portion of main piston 185. Suitable resilient annular seals or O-rings $y$ may be provided between upstanding tube 243 and main piston 185 to prevent leakage of fluid pressure thereby.

The purpose of upstanding tube 43 is to introduce or exhaust compressed air or fluid pressure with respect to inner cylinder 46 beneath the post supporting piston 183. Since piston 183 may occupy a position very close to or against piston 185 when the upper bead compressing member 160 is in close proximity to or in engagement with the lower bead compressing member 161 (FIGURE 7), it follows that upstanding tube 243 must also loosely penetrate the inner piston 183. This places the open upper end of the upstanding tube 243 well above the level of the piston 183 (FIGURE 10). Therefore, the upstanding pressure conveying tube 243 is positioned in axial alinement with one of the posts 180 and the latter post 180 is also in the form of a tube to the extent that it has a longitudinally extending bore or cavity 245 therein (FIGURE 6) which is of substantially greater diameter than the external diameter of pressure conveying tube 243 so that fluid pressure or compressed air may flow between the outer surface of the tube 243 and the inner surface of the corresponding post 180 formed by the bore 243.

The lower portion of piston 183 also has a passageway z therein (FIGURE 6) which communicates with the bore 243 in the corresponding post 180 and through which the pressure conveying tube 243 may loosely extend. It is thus seen that, regardless of the relative positions of the inner piston 183, the pressure conveying tube 243 and the main piston 185, whenever the core of valve 135 (FIGURE 12) is rotated so that communication is established between conduits 141, 143 and between conduit 140 and exhaust port 147, compressed air or fluid pressure may pass from the upper end of pipe 243 into the inner cylinder 46 between the pistons 183, 185 to thus impart upward movement to piston 183, posts 180 and the upper bead compressing member 160. Of course, while compressed air is being introduced into cylinder 46 beneath piston 183, compressed air may escape from above piston 183 through passageway w, conduit 237, elbow 240, conduits 235, 140 and valve 135 to be exhausted through outlet 147.

Although the operation of the apparatus may be understood from the foregoing description, a summary thereof will now be given.

At the start of each cycle, it is to be assumed that matrix 20 is resting upon main platform 43 and that the lower bead compressing member 161, posts 180 and the main upper clamping member 70 and associated elements occupy the raised position shown in FIGURE 3, with the upper bead compressing member 160 then being removed from the posts 180 and the posts 180 being in lowered position. A tire casing C with the tread strip C-1 thereon, and with a deflated inner tube T and the sectional curing rim R positioned therein, is then placed upon the bottom or lower bead compressing member 161 substantially as shown in FIGURE 6. It should be noted that the lower bead compressing member 161 then supports the tire casing in spaced relation above the matrix 20 and the upper annular flange 37 is not then positioned in the groove 36 in the upper end of the matrix 20.

While the various parts still occupy the latter position as described, with reference to FIGURES 3 and 6, the posts 180 may be fully raised and the upper bead compressing member 160 is then positioned upon and locked in engagement with the upper ends of the posts 180 in the manner heretofore described. The pistons 183, 185 and inner cylinder 46 may then occupy substantially fully extended or raised positions, and the beads of tire casing C must then be compressed or contracted to reduce the external diameter of tire casing C and the tread strip C-1 thereon to facilitate inserting the same in mold member 21 of matrix 20.

Therefore, the core of control valve 135 (FIGURE 12) is manipulated to move the passageways thereof from the position in which they established communication between conduits 141, 143 and between conduit 140 and outlet 147 to the position shown in FIGURE 12, thus establishing communication between conduits 143, 140 and between conduit 141 and the outlet 147. In so doing, compressed air or fluid pressure flows from the source 145 through conduits 126, 143, valve 135, conduits 140, 235 and 237, and passageway w into the upper end of inner cylinder 46. This causes inner piston 183, posts 180 and the upper bead compressing member 160 to move downwardly until the lower end of piston 183 engages the upper surface of piston 185.

Of course, as piston 183 moves downwardly compressed air is exhausted from beneath piston 183 through pressure conveying tube 243, passageway x, conduit 141, valve 135, and through outlet 147. Since inner cylinder 46 and bead compressing member 161 remain elevated as piston 183 moves downwardly, this causes the beads of the tire casing C to be drawn together or compressed by bead compressing members 160, 161, thus reducing the outside diameter of tire casing C and its tread strip C-1. During the compressing movements of the beads of tire casing C, the outer surface of rim R will cam the tire beads together and prevent the side walls of tire casing C from collapsing.

After compressing members 160, 161 have reduced the tire casing diameter, the core of valve 134 is manipulated so that compressed air flows from the source 145 through conduit 142, valve 134, conduit 137, pilot valve 212, conduit 210 and passageway 207 into chamber 50 defined between cylinders 44, 46. The main piston 185 then moves downwardly, thus moving the inner cylinder 46, the inner piston 183, bead compressing members 160, 161 and tire casing C downwardly therewith to position the tire casing C within the mold member 21 of matrix 20, substantially as shown in FIGURE 7. As the median center of the tire casing C approaches alinement with the median center of mold member 21, the lower bead compressing member 161 engages the upper end of sensing rod 215, thus moving the same downwardly to move the core 223 (FIGURE 13) of valve 212 so as to stop the flow of compressed air into the upper end of cylinder 44 and, instead, permitting compressed air to be exhausted from the upper end of cylinder 44.

As heretofore stated, the bead compressing members 160, 161 may move downwardly a short distance following the actuation of pilot valve 212 by engagement of the lower bead compressing member 161 with rod 215. However, such downward movement of the bead compressing members 160, 161 is limited by engagement of the lower surface of the tire casing C with the lower flange 35 and because of the upper bead compressing member 160 then being supported upon the upper bead of the tire casing C.

After the tire casing has been lowered into proper position within mold member 21 substantially as shown in FIGURE 7, the upper flange 37 is inserted in the groove 36 in the manner shown in FIGURE 10 and the valve 125 is manipulated so as to introduce compressed air into the lower end of cylinder assembly 113 while exhausting compressed air from the upper end thereof. In so doing, the main clamping member 70 is moved downwardly from the position of FIGURE 3 to that of FIGURES 1 and 10 thus clamping the upper flange 37 in the groove 36 in mold member 21 and also clamping matrix 20 against the bottom insulation ring 62 on main platform 43.

The inner tube T must be fully inflated at a high pressure after the matrix 20 has been clamped against main platform ring 62 by the upper clamping member 70 and after casing C has been released from bead compressing members 160, 161 so the tread strip C-1 will be forced against the inner face of mold member 21. Accordingly, since the downward pressure exerted on the clamping member 70 by the cylinder assembly 113 (FIGURE 3) is insufficient to insure that the upper flange 37 is tightly maintained in the proper position in groove 36, and an accidental drop in pressure in cylinder tube 114 would also create a safety hazard, the anchor shaft 75 is anchored in the anchor block 82 in the manner heretofore described after the upper main clamping member 70 is lowered to the operative position of FIGURES 1 and 10. Thereafter, nut 76 is tightened against hub 74 to insure that, regardless of the amount of fluid pressure in the bottom of cylinder tube 114, the pressure of the compressed air subsequently introduced into the inner tube T in the tire casing C will not so expand the side walls of the tire casing C as to raise matrix 20 off of ring 62 or to dislodge either the upper or lower flanges 37, 35.

Following the clamping of matrix 20 between members 43, 70, the beads of casing C are released from compressing members 160, 161 (FIGURE 10) by rotating the core of valve member 135 to position the passageways thereof so as to establish communication between conduits 141, 143 and between conduit 140 and outlet 147. In so doing, compressed air flows from the source 145 (FIG- URE 12) through conduit 143, valve 135, conduit 141, passageway $x$ tube 243 and the bore 245 in the corresponding post 180 to the under side of piston 183, thus raising piston 183, posts 180 and upper bead compressing member 160 to substantially the position shown in FIGURE 10. Since this moves the upper bead compressing member 160 out of engagement with the upper bead of the tire casing C then positioned within mold member 21 of matrix 20, and the pressure beneath piston 183 is also effective against the upper surface of that portion of the main piston 185 within cylinder 46, this causes piston 185 to move downwardly and thus move the inner cylinder 46, the cylinder head 173 and the lower bead compressing member 161 downwardly until the lower main piston 185 seats against the upper surface of the main base 41, for example.

Thus, both bead compressing members 160, 161 are then spaced from the beads of the tire casing C and the tire casing is permitted to expand and force the tread strip C–1 thereof against the inner periphery of mold member 21.

A conventional air pressure hose is then connected to the check valve T–3 (FIGURE 6) on the end of valve stem extension T–2 and tube T is inflated to a high pressure to force the tread strip C–1 against mold member 21. Mold member 21 may have been preheated to the desired curing temperature, as is usual. After a predetermined interval has passed sufficient to insure that the tread strip C–1 is tightly vulcanized to the tire casing C and has the proper tread configuration formed or molded in the periphery thereof, the compressed air is released from inner tube T, usually by disconnecting extension T–2 from valve stem T–1. The nut 76 on anchor shaft 75 is then loosened, anchor shaft 75 is rotated to aline the keys 80 thereon with the slots 87 and the valve 125 (FIGURE 12) is then manipulated to introduce compressed air into the upper end of cylinder tube 114 (FIGURE 3) while exhausting compressed air from the lower end of cylinder tube 114. This causes the main clamping member 70, anchor shaft 75 and nut 74 to move upwardly from the operative position of FIGURES 1 and 10 to the fully raised position of FIGURE 3, and fully exposes the upper portion of matrix 20.

The cores of the valves 134, 135 may be positioned so that the passageways therein are out of alinement with all of the corresponding conduits 136, 137, 142 and 140, 141, 143 during the curing operation. However, following the curing operation, the core of valve 134 is momentarily manipulated to establish communication between pipes 136, 142 to introduce compressed air into the lower end of main cylinder 44 until the lower bead compressing member 161 moves inwardly from the position of FIGURE 10 to substantially the position shown in FIGURE 7.

The core of valve 135 is also momentarily manipulated to cause the same to occupy the position of FIGURE 12 for introducing compressed air into the upper end of auxiliary or inner cylinder 46 until the upper bead compressing member 160 also moves from the position of FIGURE 10 to substantially the position shown in FIGURE 7. It is apparent that this again reduces the diameter of the tire casing C and tread strip C–1 and withdraws the tread strip from engagement with the tread face of mold member 21.

Thereafter, the core of valve 134 is again manipulated to introduce compressed air into the lower end of cylinder 44 so that both bead compressing members 160, 161, and the tire casing C, move upwardly sufficiently to raise the tire casing out of mold member 21 and to substantially the position shown in FIGURE 6. In so doing, the tire casing engages and raises flange 37 out of engagement with the groove 36 in the upper end of mold member 21 so that flange 37 may be readily removed from the mold stand.

Thereafter, the core of valve 135 is again manipulated to establish communication between conduits 141, 143, thus introducing compressed air into the inner cylinder 46 between the pistons 183, 185. Since piston 185 has been held in raised position by the compressed air or fluid pressure therebeneath, it is apparent that the piston 183, posts 180 and upper bead compressing member 160 may be moved to the fully raised position shown in FIGURES 3 and 6, thus releasing the upper bead of the tire casing C from the pressure of the upper bead compressing member 160 and permitting the tire casing to return to its normal diameter.

The upper bead compressing member 160 is then removed from the posts 180 in the manner heretofore described, and the posts 180 are then lowered. It should be noted that the tire casing and the space between the same and the upper clamping member 70 are free of all obstructions so the tire casing C may then be readily lifted off the lower bead compressing member 161. The posts 180 then may be returned to raised position preparatory to a succeeding cycle in the operation of the mold machine. The segmental curing rim R and tube T are then removed from the tire casing and may be inserted in another tire casing to be installed in the mold member 21.

It is thus seen that we have provided an improved matrix-supporting mold machine for recapping pneumatic tire casings and wherein a tire bead compressing or contracting mechanism is so incorporated with the mold machine as to permit locking the matrix-clamping members 43, 70 in clamping position by a single, centrally or axially disposed anchor shaft 75 and also wherein the upper matrix clamping member 70 and the anchor shaft is shiftable as a unit so as to be raised away from the matrix and the tire bead contracting mechanism to thereby permit access to the matrix and the tire bead contracting mechanism without being encumbered by any parts of the mold machine above the matrix and the bottom bead compressing member 161.

In the drawings and specification there has been set forth a preferred embodiment of the invention and, although specific terms are employed, they are used in a generic and descriptive sense only and not for purposes of limitation, the scope of the invention being defined in the claims.

We claim:

1. In a tire recapping apparatus having a stationary platform provided with an opening therein and being adapted to support an annular mold matrix thereon with the axis of the matrix alined with the opening in said platform; the combination therewith of a tire-diameter-reducing apparatus comprising (a) an axially movable fluid pressure cylinder penetrating said opening in said platform,
   (b) a piston in said cylinder,
   (c) a pair of tire-bead-engaging members adjacent one end of said cylinder and being operatively connected in fixed relation to said cylinder and said piston, respectively, and disposed in substantially axial alinement with said cylinder,
   (d) means for selectively and alternatively introducing fluid pressure into opposite ends of said cylinder to effect movement to said piston and the bead-engaging member operatively connected thereto relative to said cylinder and to the other of said bead-engaging members, and
   (e) means operable independently of the fluid pressure in said cylinder for selectively extending and retracting said cylinder relative to said platform.

2. A structure according to claim 1, including means operatively associated with said means (e) for automatically stopping movement of said cylinder at a given point in the course of retraction of said cylinder relative to said platform.

3. A structure according to claim 1, in which said means (e) for selectively extending and retracting said cylinder comprises
   (1) an outer cylinder of greater diameter than said first-named cylinder and being carried by said platform in coaxial relation to said first-named cylinder,
   (2) an outer piston in said outer cylinder and to which the end of said first-named cylinder opposite from said bead-engaging members is fixedly connected, and
   (3) means for selectively and alternatively introducing fluid pressure into opposite ends of said outer cylinder to effect movement to said outer piston and said first-named cylinder relative to said outer cylinder and said platform.

4. A structure according to claim 3, including means responsive to retraction of said first-named cylinder a predetermined distance into said outer cylinder for interrupting the introduction of fluid pressure into that end of the outer cylinder effecting such retraction of the first-named cylinder.

5. In a tire recapping apparatus having a substantially horizontally disposed platform provided with an opening therein and being adapted to support an annular mold matrix thereon in registration with said opening; the combination therewith of
   (a) an axially movable first fluid pressure cylinder loosely penetrating said opening in said platform,
   (b) a first piston in said cylinder,
   (c) a plurality of substantially circularly arranged posts fixed to said cylinder and projecting upwardly therefrom beyond the upper end of said cylinder,
   (d) a first tire-bead-engaging member carried by an upper portion of said cylinder and movable therewith,
   (e) a second tire-bead-engaging member carried by said posts and positioned above said first bead-engaging member,
   (f) means for selectively and alternatively introducing fluid pressure into opposite ends of said cylinder to effect movement to said second bead-engaging member relative to said first bead-engaging member, and
   (g) means operable independently of the fluid pressure in said cylinder for selectively raising and lowering said cylinder relative to said platform.

6. A structure according to claim 5, in which said first and second bead-engaging members are each substantially circular in plan, and wherein the proximal surfaces of said first and second bead-engaging members are each provided with a plurality of stepped surfaces of different diameters thereon to accommodate the beads of tire casings of different diameters.

7. A structure according to claim 5, in which said means (g) for selectively raising and lowering said first cylinder relative to said platform comprises
   (1) a second piston on a lower portion of said first cylinder and being of substantially greater diameter than said first cylinder,
   (2) a second cylinder positioned beneath said platform, in substantially coaxial relation with said first cylinder and in which said second piston has vertical movement, and
   (3) means for selectively and alternatively introducing fluid pressure into opposite ends of said second cylinder to effect movement to said first cylinder and said bead-engaging members relative to the platform.

8. A structure according to claim 7, including means responsive to predetermined downward movement of said first cylinder from a raised position by the introduction of fluid pressure into the upper end of said second cylinder for interrupting the introduction of fluid pressure into the upper end of said second cylinder and exhausting fluid pressure therefrom.

9. In a tire recapping apparatus having a platform for supporting thereon an annular mold matrix of the type having a removable annular upper flange thereon, and a vertically movable upper clamping member adapted to clamp said flange against said matrix and to clamp said matrix against said platform; the combination therewith of
   (a) a substantially centrally disposed anchor shaft movable with said clamping member,
   (b) an anchor block in a central portion of said platform having means for detachably connecting said anchor shaft thereto,
   (c) a column fixedly connected to said block and to said base,
   (d) means for contracting the beads of a tire casing for inserting and removing the same with respect to said matrix and comprising
      (1) an annular lower bead compressing member and an annular upper bead compressing member encircling the vertical plane of said anchor block and said column,
      (2) fluid-pressure-operated means for unitarily raising and lowering said bead compressing members relative to said block, and
      (3) independent fluid-pressure-operated means for raising and lowering said upper bead compressing member relative to said lower bead compressing member.

10. A structure according to claim 9, including a single manually operated control valve interposed in a fluid pressure circuit to said first-named fluid-pressure-operated means for controlling the flow of fluid pressure thereto, and a separate manually operated control valve interposed in a fluid pressure circuit to said independent fluid-pressure-operated means for controlling the flow of fluid pressure thereto.

11. In a tire recapping apparatus having a base, a main platform spaced above said base for supporting a mold matrix thereon, an upper substantially vertically movable clamping member for clamping said matrix against said platform and a substantially centrally disposed anchor shaft carried by said member; the combination therewith of
   (a) a substantially centrally disposed and substantially upright column fixed to said base and having means for detachably connecting said anchor shaft thereto,
   (b) a large main fluid pressure cylinder surrounding said column and positioned between said platform and said base,
   (c) a main annular piston in said main cylinder and encircling said column,
   (d) an inner cylinder loosely encircling said column, spaced inwardly of said main cylinder, projecting upwardly from said main piston and loosely penetrating said platform,
   (e) a lower bead contracting member on the upper end of said inner cylinder,
   (f) an annular inner piston in said inner cylinder and encircling said column,
   (g) a plurality of circularly arranged posts projecting upwardly from said inner piston and loosely penetrating said lower contracting member,
   (h) an upper bead contracting member,
   (i) means for detachably securing said upper bead contracting member to the upper ends of said posts above said lower contracting member, and
   (j) manually operable means for selectively introducing fluid pressure into said main and inner cylinders above and below said main and inner pistons whereby said contracting members may be raised and lowered relative to each other and relative to said platform and said column.

12. A structure according to claim 11 including an annular cylinder head on the upper end of said inner cylinder, an upright tube surrounding said column, and the inner peripheral surfaces of said main and inner pistons and said cylinder head being movable in fluid-tight sealing engagement with said upright tube.

13. A structure according to claim 11, in which said platform serves as a closure for the upper end of said main cylinder, and fluid sealing means between said inner cylinder and said platform where the same is penetrated by said inner cylinder.

14. A structure according to claim 11, in which each of said bead contracting members is circular.

15. A structure according to claim 11, in which said means (i) for detachably securing said upper bead contracting member to said posts comprises
   (1) a hub on said upper bead contracting member and having a plurality of circularly arranged bayonet slots therein corresponding to said posts, and
   (2) each of said posts having a reduced portion adjacent its upper end defining a cap thereon and adapted to engage in the corresponding bayonet slot.

16. A structure according to claim 11, including means responsive to lowering of said inner cylinder a predetermined distance into said main cylinder for interrupting the introduction of fluid pressure into the main cylinder above said main piston.

17. A structure according to claim 11, wherein said manually operable means (j) comprises
   (1) a first four-way valve interposed in a fluid pressure circuit from a source of fluid pressure to upper and lower portions of said main cylinder, and
   (2) a second four-way valve interposed in a fluid pressure circuit to upper and lower portions of said inner cylinder,
       (k) a safety valve interposed between, and normally maintaining communication between, the upper end of said main cylinder and said first valve when said inner cylinder and said lower bead contracting member occupy a raised position relative to said main cylinder, and
       (l) means responsive to downward movement of said lower bead contracting member to a predetermined position adjacent to but spaced above said platform for operating said safety valve and interrupting communication between said first valve and the upper end of said main cylinder while permitting fluid pressure to exhaust from the upper end of said main cylinder.

18. In a tire recapping apparatus having a base, a main platform spaced above said base for supporting a mold matrix thereon, an upper substantially vertically movable clamping member for clamping said matrix against said platform, and a substantially centrally disposed anchor shaft carried by said member; the combination therewith of
   (a) a substantially centrally disposed column fixed to said base and having means for detachably connecting said anchor shaft to its upper portion,
   (b) a main fluid pressure cylinder surrounding said column and positioned between and in engagement with said platform and said base,
   (c) a main annular piston in said main cylinder,
   (d) an inner cylinder of substantially lesser diameter than and movable within said main cylinder, projecting upwardly from said main piston and loosely penetrating said platform,
   (e) a lower tire-bead compressing member on the upper end of said inner cylinder,
   (f) an inner annular piston in said inner cylinder and encircling said column,
   (g) a plurality of circularly arranged posts projecting upwardly from said inner piston and loosely penetrating said lower compressing member,
   (h) an upper tire-bead compressing member attached to the upper portions of said posts above said lower compressing member,
   (i) first manually operable means for selectively introducing fluid pressure into said main cylinder above and below said main piston, and
   (j) second manually operable means for selectively introducing fluid pressure into said inner cylinder above and below said inner piston.

19. A structure according to claim 18 wherein said second manually operable means (j) comprises
   (1) first conduit means extending from said base,
   (2) second conduit means communicating with and extending from the upper end of said inner cylinder,
   (3) manually operable valve means for selectively effecting communication between a source of fluid pressure and each of said first and second conduit means,
   (4) an elongate upstanding and open-topped tube fixed to said base within the confines of said main cylinder and communicating with said first conduit means,
   (5) one of said posts having an elongate longitudinally extending cavity therein communicating with the bottom surface of said inner piston, being of larger cross-sectional area than that of said tube, and adapted to loosely receive an upper portion of said tube therein, and
   (6) said tube loosely penetrating said main piston in sealing engagement therewith and being of such length that its upper end is disposed above said main piston at all times regardless of the position of said main piston relative to said base to thereby provide continuous communication between said first conduit means and the lower portion of said inner cylinder below said inner piston.

20. In a tire recapping apparatus having a substantially horizontally disposed platform provided with a substantially circular upper portion for supporting thereon an annular mold matrix, a movable upper clamping member adapted to engage and clamp said matrix against said platform, and an anchor shaft carried by said clamping member and adapted to extend axially in substantially concentric relation to said substantially circular portion of said platform when said upper clamping member is in engagement with a matrix supported on the platform, the combination therewith of a tire-diameter-reducing mechanism comprising
   (a) an anchor block carried in fixed axial relation to said platform and having means for detachably connecting said anchor shaft thereto,
   (b) a closed axially movable fluid pressure cylinder encircling and being of substantially greater internal diameter than the vertical plane of said anchor block,
   (c) means for raising and lowering said cylinder relative to said platform and said anchor block,
   (d) an annular piston in said cylinder and also encircling the vertical plane of said anchor block,
   (e) a pair of relatively axially positioned tire bead-engaging members positioned above said platform,
   (f) means operatively connecting one of said bead-engaging members in fixed relation to said cylinder,
   (g) means operatively connecting the other of said bead-engaging members in fixed relation to said piston for movement toward and away from said one of said bead-engaging members, and
   (h) means for raising and lowering said piston while raising and lowering said other of said bead-engaging members therewith relative to said cylinder, said anchor block and said one of said bead-engaging members.

21. The combination with a tire recapping apparatus having support means for supporting an annular mold matrix thereon of means for inserting and removing a tire casing from said matrix comprising a pair of first and second axially alined tire-bead-engaging members positioned for relative movement on a common axis concentric with said matrix, an axially movable element supporting said first tire-bead-engaging member, at least one rod loosely penetrating said first tire-bead-engaging member and supporting thereon said second tire-bead-engaging member, first fluid operated means for selectively extending and retracting said axially movable element relative to said matrix to extend and retract said first tire-bead-engaging member relative to said matrix and to cause said second tire-bead-engaging member to move in unison with said first tire-bead-engaging member, and second fluid operated means operable independently of said first fluid operated means for selectively extending and retracting said rod and said second tire-bead-engaging member relative to said first tire-bead-engaging member and relative to said matrix.

References Cited by the Examiner

UNITED STATES PATENTS

| | | | |
|---|---|---|---|
| 1,836,850 | 12/1931 | Hudson | 18—18 |
| 2,908,939 | 10/1959 | Eriksen et al. | 18—18 |
| 2,948,924 | 8/1960 | Clapp | 18—18 |
| 3,162,898 | 12/1964 | Fike | 18—18 |

FOREIGN PATENTS 1,118,442 11/1961 Germany.

JACOB H. STEINBERG, *Primary Examiner.*

HAROLD ANSHER, *Examiner.*